US012694038B2

(12) United States Patent
Giblin et al.

(10) Patent No.: US 12,694,038 B2
(45) Date of Patent: Jul. 28, 2026

(54) OPTIMIZING GOVERNED DATA TRANSFER IN A MULTI-CLOUD ENVIRONMENT USING LINEAGE DATA

(71) Applicant: INTERNATIONAL BUSINESS MACHINES CORPORATION, Armonk, NY (US)

(72) Inventors: Christopher J. Giblin, Zurich (CH); Rajmohan Chandrahasan, Kanchipuram district (IN); Himanshu Gupta, New Delhi (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/240,504

(22) Filed: Aug. 31, 2023

(65) Prior Publication Data

US 2025/0077537 A1 Mar. 6, 2025

(51) Int. Cl.
| | |
|---|---|
| *G06F 7/00* | (2006.01) |
| *G06F 16/22* | (2019.01) |
| *G06F 16/2457* | (2019.01) |
| *G06F 16/25* | (2019.01) |
| *G06F 17/00* | (2019.01) |

(52) U.S. Cl.
CPC .......... *G06F 16/254* (2019.01); *G06F 16/221* (2019.01); *G06F 16/24573* (2019.01)

(58) Field of Classification Search
None
See application file for complete search history.

(56) References Cited

U.S. PATENT DOCUMENTS

| | | | | |
|---|---|---|---|---|
| 1,053,905 | A * | 2/1913 | Couls ..................... | B65D 49/04 |
| | | | | 215/26 |
| 11,579,911 | B1 * | 2/2023 | Santos ................ | G06F 11/3688 |
| 2014/0379665 | A1 * | 12/2014 | Benjamin .............. | G06Q 40/00 |
| | | | | 707/769 |
| 2015/0012478 | A1 * | 1/2015 | Mohammad .......... | G06F 16/254 |
| | | | | 707/602 |
| 2021/0191957 | A1 * | 6/2021 | Swamy .................. | G06N 5/025 |
| 2021/0286760 | A1 * | 9/2021 | Aldred .................. | G06F 16/162 |

(Continued)

OTHER PUBLICATIONS

Priya et al., "Data Transfer With Optimization Among Different Cloud Platform Efficiently", https://www.researchgate.net/publication/306322258, Sep. 15, 2016; 6 Pages.

(Continued)

*Primary Examiner* — Tuan A Pham
(74) *Attorney, Agent, or Firm* — Seed Intellectual Property Law Group LLP

(57) ABSTRACT

A method, system, and computer program product are configured to: receive a data transfer request to transfer a dataset stored on a source cloud to a destination cloud; determine a target view of the data transfer request based on one or more policies; determine, using lineage metadata, a first portion of the target view exists in one or more copies of a dataset stored on the destination cloud; extract data corresponding to the first portion from the one or more copies of the dataset stored on the destination cloud; create the target view using the extracted data; and serve the data transfer request using the created target view.

18 Claims, 12 Drawing Sheets

(56) References Cited

U.S. PATENT DOCUMENTS

| | | | | |
|---|---|---|---|---|
| 2022/0198034 | A1* | 6/2022 | Rodriguez | H04L 9/30 |
| 2023/0046983 | A1* | 2/2023 | Gunasekaran | G06F 3/0659 |
| 2023/0195515 | A1* | 6/2023 | Zhang | G06F 9/5027 |
| | | | | 718/102 |
| 2023/0342373 | A1* | 10/2023 | Kotni | G06F 16/128 |

OTHER PUBLICATIONS

Hong et al., "Enhancing Data Transfer Performance Utilizing a DTN between Cloud Service Providers", https://www.mdpi.com/2073-8994/10/4/110, Apr. 16, 2018; 10 Pages.

Mishra et al., "LDM: Lineage-aware Data Management in multi-tier storage system", https://www.researchgate.net/publication/326262509, Jul. 8, 2018, 13 pages.

Anonymous, "Minimize Costly Inter-cloud Data Transfers", https://www.equinix.es/content/dam/eqxcorp/en_us/documents/resources/blueprints/bp_ design_pattern_minimize_costly_intercloud_data_transfers_en_oct2020.pdf, Accessed Jun. 22, 2023; 1 Page.

Jain et al., "Skyplane: Optimizing Transfer Cost and Throughput Using Cloud-Aware Overlays", https://arxiv.org/abs/2210.07259, Oct. 13, 2022; 15 Pages.

Suen et al., "S2Logger: End-to-End Data Tracking Mechanism for Cloud Data Provenance", https://ieeexplore.ieee.org/abstract/document/6680891, Jul. 16-18, 2013; 2 Pages.

Ko et al., "Flogger: A File-Centric Logger for Monitoring File Access and Transfers within Cloud Computing Environments", https://ieeexplore.ieee.org/document/6120893, Nov. 16-18, 2011; 2 Pages.

Zhang et al., "How to Track Your Data: Rule-Based Data Provenance Tracing Algorithms", https://ieeexplore.ieee.org/document/6296150, Jun. 25-27, 2012; 2 Pages.

Kunz et al., "Towards Tracking Data Flows in Cloud Architectures", https://arxiv.org/pdf/2007.05212.pdf, Jul. 10, 2020; 11 Pages.

Wu et al., "PandaSync: Network and Workload aware Hybrid Cloud Sync Optimization", https://par.nsf.gov/servlets/purl/10095178, Jul. 7-10, 2019; 11 Pages.

Abramson et al., "A Cache-Based Data Movement Infrastructure for On-demand Scientific Cloud Computing", https://ink.springer.com/chapter/10.1007/978-3-030-18645-6_3, Apr. 16, 2019; 47 Pages.

Arteaga et al., "CloudCache: On-demand Flash Cache Management for Cloud Computing", https://www.usenix.org/system/files/conference/fast16/fast16-papers-arteaga.pdf, Feb. 22-25, 2016; 16 Pages.

Li et al., "Effective replica management for improving reliability and availability in edge-cloud computing environment", https://www.sciencedirect.com/science/article/abs/pii/S0743731520302719, Sep. 2020; 9 Pages.

* cited by examiner

Figure 1:
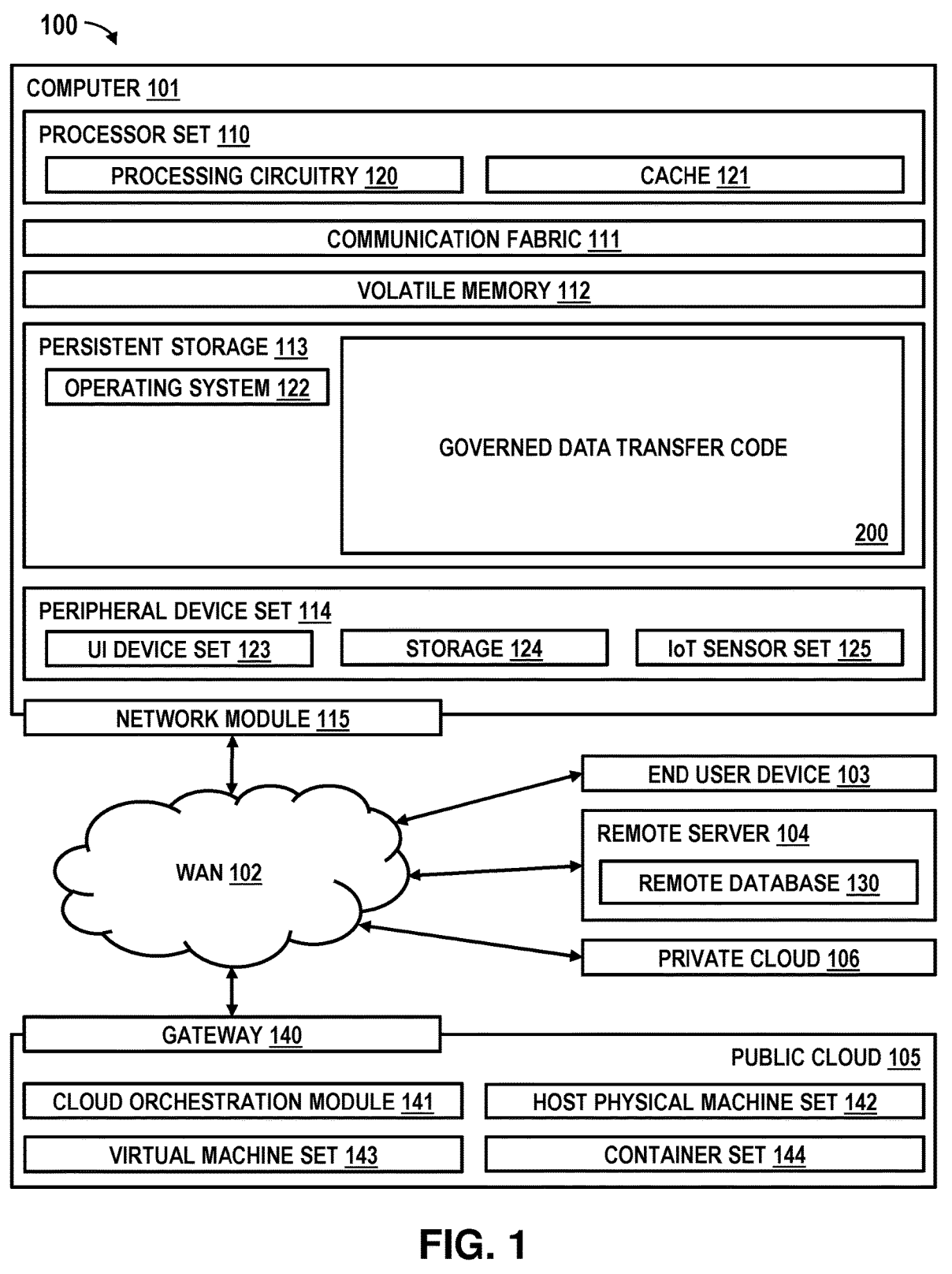

100

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

GOVERNED DATA TRANSFER CODE

200

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141      HOST PHYSICAL MACHINE SET 142

VIRTUAL MACHINE SET 143      CONTAINER SET 144

Mediator server
225

Mediator module
245

Policy data
255

Analyzer module
250

Lineage metadata
260

First cloud
215

Datasets D1, D2, ..., Dn

Data lineage information
235

Change data capture
(CDC) information
240

Network
210

Second
cloud
220

User
device
230

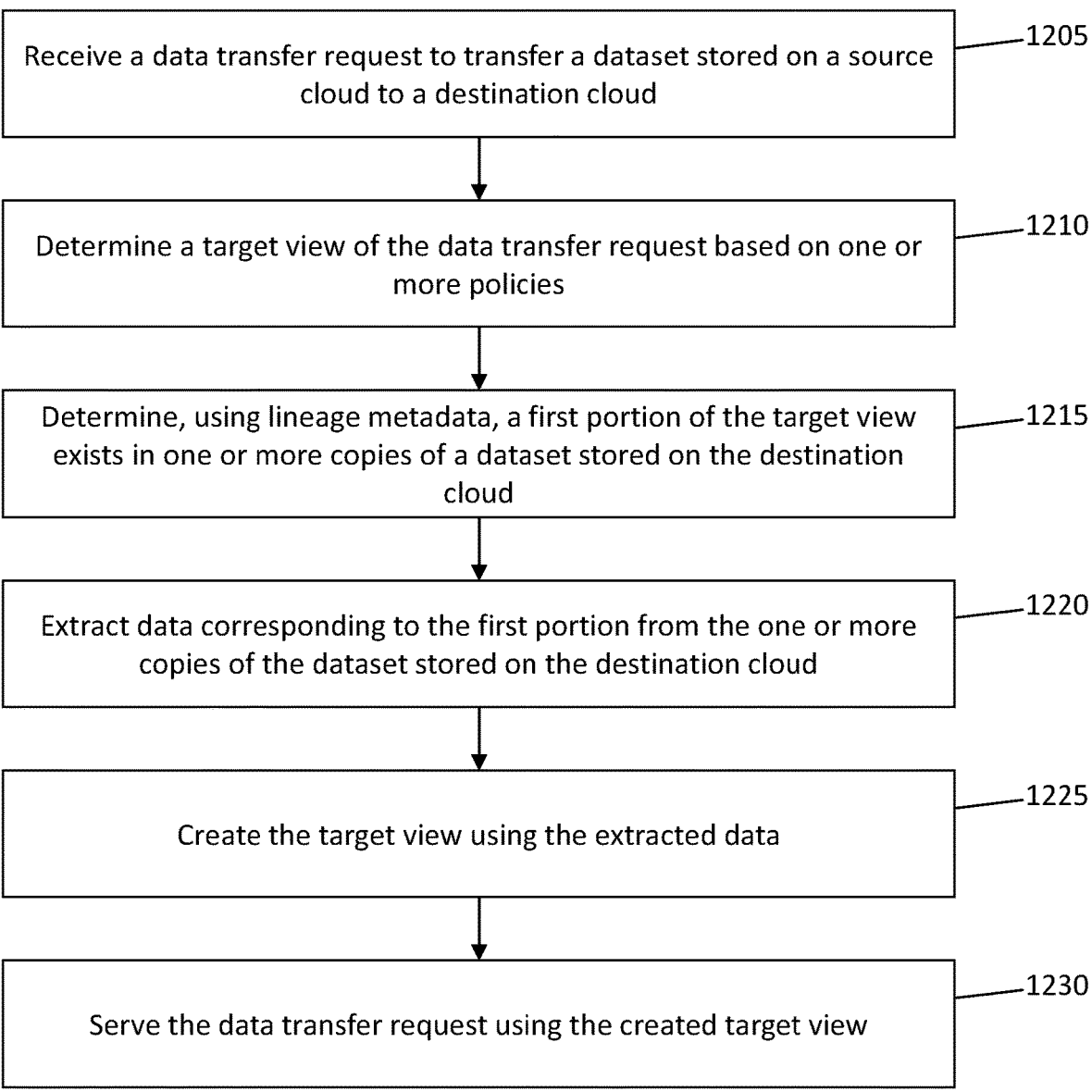

Receive a data transfer request to transfer a dataset stored on a source cloud to a destination cloud — 1205

Determine a target view of the data transfer request based on one or more policies — 1210

Determine, using lineage metadata, a first portion of the target view exists in one or more copies of a dataset stored on the destination cloud — 1215

Extract data corresponding to the first portion from the one or more copies of the dataset stored on the destination cloud — 1220

Create the target view using the extracted data — 1225

Serve the data transfer request using the created target view — 1230

FIG. 12

OPTIMIZING GOVERNED DATA TRANSFER IN A MULTI-CLOUD ENVIRONMENT USING LINEAGE DATA

BACKGROUND

Aspects of the present invention relate to governed data transfer in a multi-cloud environment.

Governed data transfer in a multi-cloud environment involves the movement of data from one cloud to another in the multi-cloud environment, where the movement of the data is governed by various policies (e.g., rules). The policies may be based on various criteria like the role of the user, geographic location of the user, geographic location of the source cloud, geographic location of the destination cloud, purpose for which the data is being requested, etc. Based on these policies, a data mediator may transform the data when serving a data transfer request. For example, one or more columns of the data may be redacted, obfuscated, substituted, dropped, etc.

SUMMARY

In a first aspect of the invention, there is a computer-implemented method including: receiving, by a processor set, a data transfer request to transfer a dataset stored on a source cloud to a destination cloud; determining, by the processor set, a target view of the data transfer request based on one or more policies; determining, by the processor set, using lineage metadata, a first portion of the target view exists in one or more copies of a dataset stored on the destination cloud; extracting, by the processor set, data corresponding to the first portion from the one or more copies of the dataset stored on the destination cloud; creating, by the processor set, the target view using the extracted data; and serving, by the processor set, the data transfer request using the created target view.

In another aspect of the invention, there is a computer program product including one or more computer readable storage media having program instructions collectively stored on the one or more computer readable storage media. The program instructions are executable to: receive a data transfer request to transfer a dataset stored on a source cloud to a destination cloud; determine a target view of the data transfer request based on one or more policies; determine, using lineage metadata, a first portion of the target view exists in one or more copies of a dataset stored on the destination cloud; extract data corresponding to the first portion from the one or more copies of the dataset stored on the destination cloud; create the target view using the extracted data; and serve the data transfer request using the created target view.

In another aspect of the invention, there is a system including a processor set, one or more computer readable storage media, and program instructions collectively stored on the one or more computer readable storage media. The program instructions are executable to: receive a data transfer request to transfer a dataset stored on a source cloud to a destination cloud; determine a target view of the data transfer request based on one or more policies; determine, using lineage metadata, a first portion of the target view exists in one or more copies of a dataset stored on the destination cloud; extract data corresponding to the first portion from the one or more copies of the dataset stored on the destination cloud; create the target view using the extracted data; and serve the data transfer request using the created target view.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 12 shows a flowchart of an exemplary method in accordance with aspects of the present invention.

DETAILED DESCRIPTION

Figure 2:
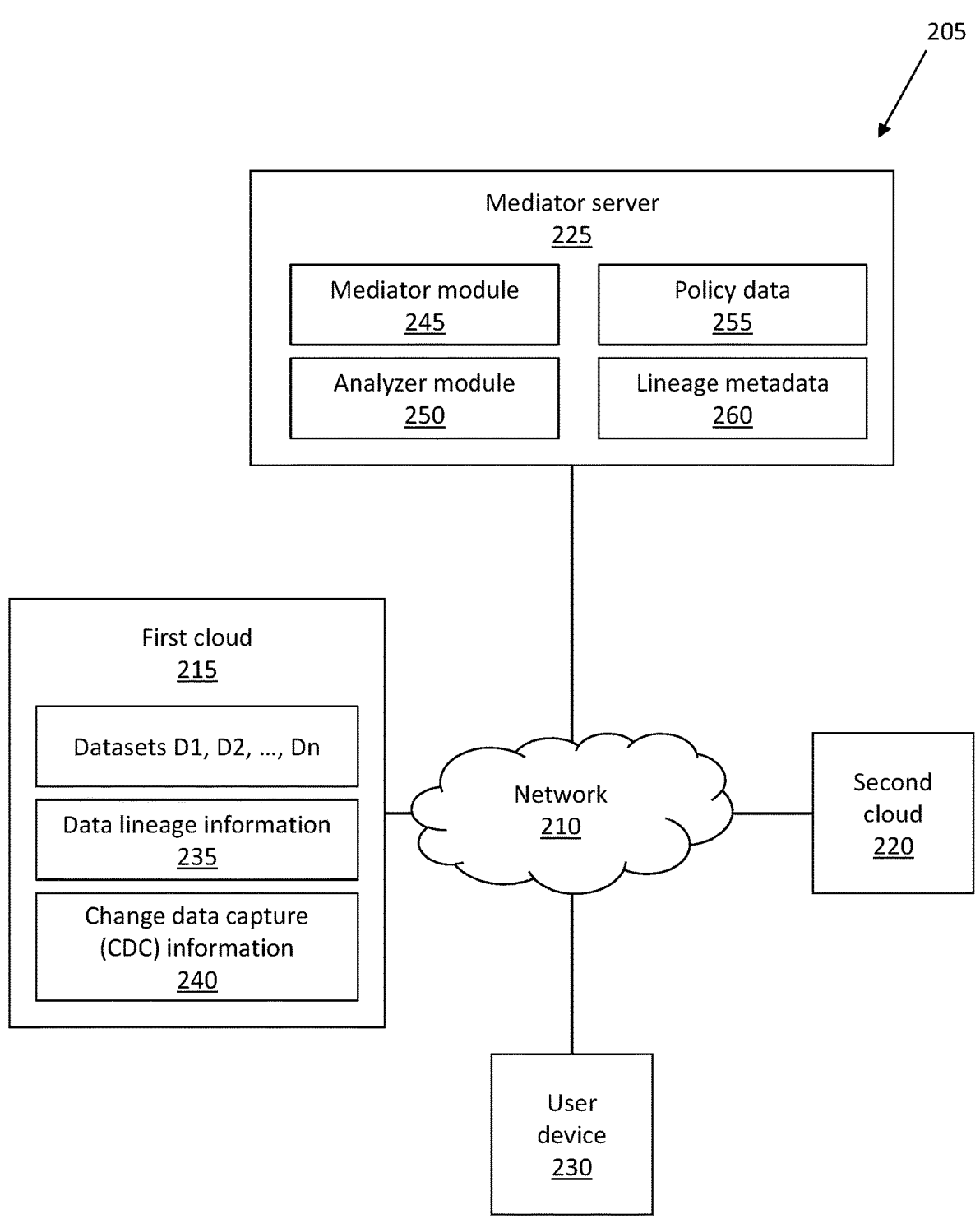
FIG. 2 shows a block diagram of an exemplary environment in accordance with aspects of the present invention.

Aspects of the present invention relate generally to governed data transfer in a multi-cloud environment and, more specifically, to optimizing governed data transfer in a multi-cloud environment using lineage data. According to an aspect of the invention, there is a method for using lineage metadata collected at data mediators to optimize data communication, where the method includes identifying whether a data transfer request can be served by transferring only a subset of data from a source cloud with another portion of the data being retrieved and/or constructed from one or more previous copies of the same dataset on the same destination cloud. According to another aspect of the invention, there is a method for using data lineage information to optimize data communication, where the method includes identifying whether a data transfer request can be served by using copies of other 'in-lineage' datasets on the destination cloud.

Governed data transfer involves receiving a request for data transfer from a source cloud to a destination cloud, determining one or more policies that apply to the request, obtaining the data from the source cloud, transforming the data based on the one or more policies that apply to the request, and transferring the transformed data to the destination cloud. Policies may depend on user role, user geographic location, data geographic location, intended usage of the data, etc. Transformations may include, for example, dropping, redacting, obfuscating, or encrypting one or more columns of the data prior to transferring the data to the destination cloud. For example, a dataset on a source cloud may include five columns C1, C2, C3, C4, and C5, and the view of the data that is presented to the requesting user on the destination cloud may include C1, Redact(C3), and Obfuscate(C4). In this example, the data of column C1 is unchanged, the data in column C3 is redacted, the data in column C4 is obfuscated, and the data in columns C2 and C5 is dropped from (i.e., now shown) in the view of the data that is presented to the requesting user. Each data transfer request is handled independently of the others, such that the requested data is obtained from the source cloud, transformed, and transferred for each time a request is made. Serving a data transfer request in this manner has two significant costs. First, there is a data processing cost involved in applying the relevant transformations to the data based on the policies. Second, there is a data transfer cost involved in moving the data from the source cloud to the destination cloud. A same dataset can be requested and transferred time and again by different users having a same role (e.g., data engineer) at a same destination cloud, and handling each of these requests involves obtaining the same data anew, applying transformations to the data, and transferring the data. Similarly, even when requests are made by users having different roles, there are often times when the same data with the same transformation is transferred to the same destination cloud, thus incurring data processing costs and data transfer costs again and again for the same data.

Implementations of the invention address this problem of conventional governed data transfer by identifying a subset of data that is present on a destination cloud from a previous data transfer request and using this subset of data when handling a new data transfer request. In embodiment, this is done by collecting and using lineage data at a mediator and optionally at the source cloud and the destination cloud. In this manner, implementations of the invention avoid the repetitive tasks that needlessly incur costs in conventional governed data transfer systems, thus providing an improvement in the technology of governed data transfer.

Implementations of the invention are necessarily rooted in computing technology. For example, embodiments control the manner in which data is obtained from a source cloud, transformed, and transferred to a destination cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as governed data transfer code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment includes a network 210 that provides network communication between a first cloud 215, a second cloud 220, a mediator server 225, and a user device 230. The network 210 may comprise the WAN 102 of FIG. 1. The first cloud 215 and the second cloud 220 may comprise instances of a public cloud 105 or private cloud 106 of FIG. 1. The user device 230 may comprise the EUD 103 of FIG. 1. The mediator server 225 may comprise one or more instances of the computer 101 of FIG. 1, or one or more virtual machines or containers running on one or more instances of the computer 101 of FIG. 1.

In embodiments, the first cloud 215 stores datasets D1, D2, . . . , Dn where "n" is any suitable number without limitation. In embodiments, the first cloud 215 creates and stores data lineage information 235 and change data capture (CDC) information 240. In embodiments, the CDC information 240 defines changes that have occurred to ones of the datasets D1-$n$ stored on the first cloud 215 including what data was changed and the date and time the change occurred. In embodiments, the data lineage information 235 defines lineage relationships between respective ones of the datasets D1-$n$, such as how ones of datasets D1-$n$ are derived from one another, and the transformations involved in that derivation. For example, dataset Dn may have been created by combining datasets D1 and D2, by multiplying all the data in a first column dataset D1 by a discount factor, and also by creating a new column that includes concatenated values of a second column and a third column of dataset D1. In this example, the data lineage information 235 defines the input datasets (e.g., D1 and D2), the output dataset (e.g., Dn), the details of what transformations were applied to the input datasets to create the output dataset, and column lineage information including the transformations on each column individually.

In embodiments, the mediator server 225 comprises mediator module 245, analyzer module 250, policy data 255, and lineage metadata 260. The mediator module 245 and analyzer module 250 may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The mediator server 225 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the mediator module 245 performs data mediator functions including but not limited to: receiving a data transfer request from the user device 230, identifying a dataset (e.g., D1) on the first cloud based on the data transfer request, determining one or more policies of the policy data 255 that apply to the data transfer request, determining one or more transformations to the dataset based on the one or more policies, determining a target view of the data transfer request based on the dataset and the one or more transformations, and serving the data transfer request by transferring data defining the target view to the source cloud 220. In a non-limiting example, the mediator server 225 may be part of a Fybrik platform, which is an open-source cloud-based service (e.g., infrastructure-level platform) for orchestrating secure data governance across companies and platforms, and the mediator module 245 may perform functions of the Fybrik platform.

Still referring to the mediator server 225 of FIG. 2, the policy data 255 comprises data that defines one or more polices of the governed data transfer of the datasets D1-*n* of the first cloud 215. The policies may be based on various criteria like the role of the user, geographic location of the user, geographic location of the source cloud, geographic location of the destination cloud, purpose for which the data is being requested, etc. In embodiments, the policies define transformations to apply to the data of a dataset before transferring the data to the second cloud 220 as part of serving a data transfer request.

In embodiments, the transformations defined by the policies are applied to columns of a dataset (e.g., D1). The transformations may include but are not limited to: redact, obfuscate, substitute, scramble, shuffle, and nullify. In one example, the redact transformation causes all the characters in the data to be replaced by a letter such as X. For example, in a redact transformation, the data 312-821-1420 would be replaced by XXXXXXXXXX. In another example, the obfuscate transformation replaces data with similarly formatted values. For example, in an obfuscate transformation, the data 312-821-1420 would be replaced by 003-599-6340. In another example, the substitute transformation replaces values with randomly generated values that preserve referential integrity but not original data format. For example, in a substitute transformation, all instances of the data 312-821-1420 would be replaced by 1234abcd4567. These examples are not limiting, and other types of transformations may be defined by the policies on the policy data 255.

With continued reference to the mediator server 225 of FIG. 2, the lineage metadata 260 comprises respective metadata created for each respective data transfer request. In embodiments, the lineage metadata of a data transfer request defines aspects of the data transfer request including but not limited to: user identification of the user making the request; user role of the user making the request; other contextual information about the user making the request; source cloud of the request; destination cloud of the request; geographic location of the source cloud; geographic location of the destination cloud; geographic location of the user making the request; a status indicator of whether the request was successfully served or denied; a reason the request was denied (in instances when the request was denied); a purpose of the request (e.g., an intended use of the requested data, such as marketing analysis, patient analysis, etc.); policy references (e.g., which policies were applied to the request); enforcement actions (e.g., which transformations were applied to which columns of the dataset); a timestamp of the data transfer of the request; and a reference to the transferred copy of the data on the destination cloud (if the request was successfully served). In embodiments, the mediator module 245 creates and stores such lineage metadata in the lineage metadata 260 for each data transfer request.

Figure 3:
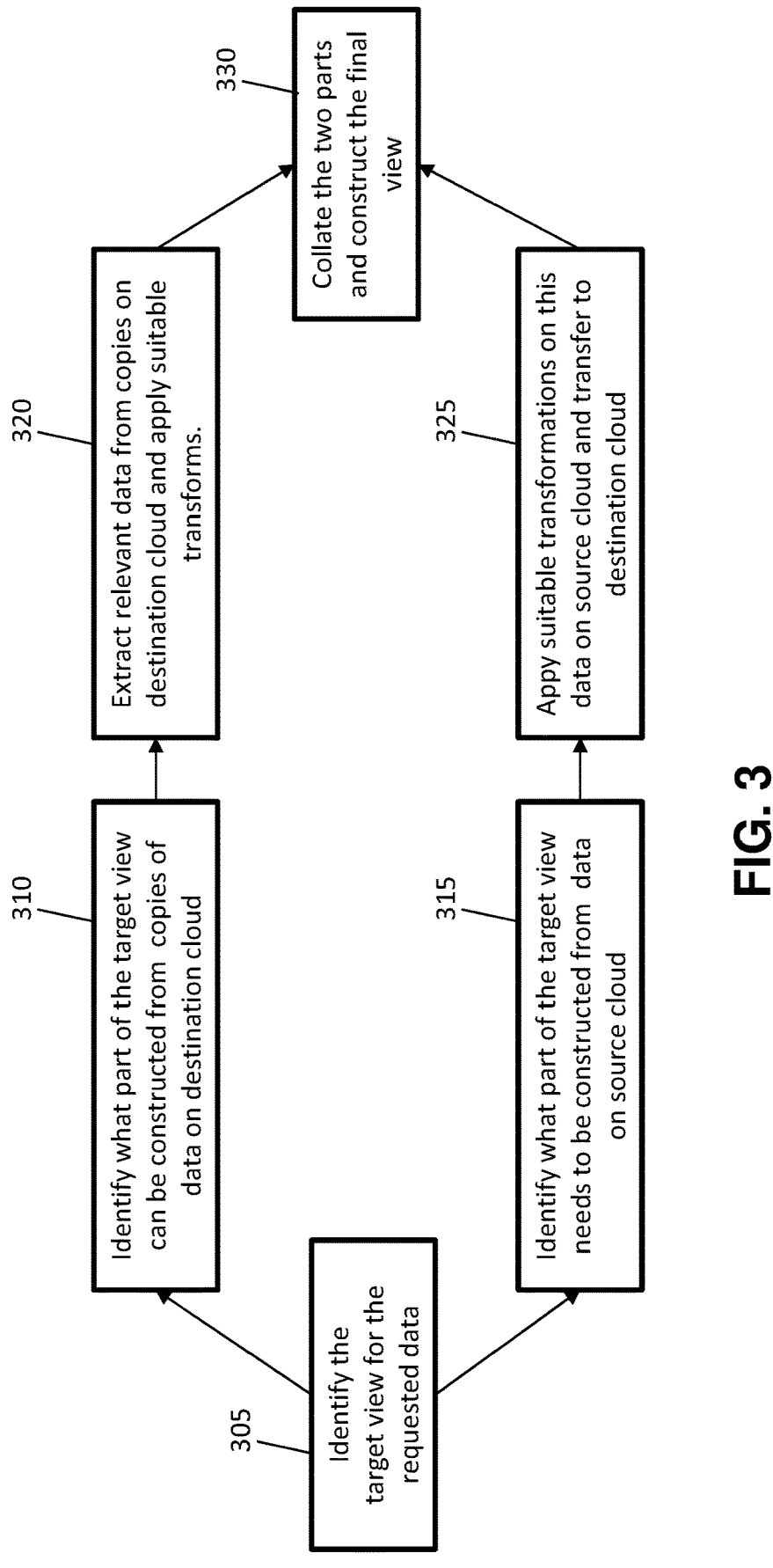
FIG. 3 shows a block diagram in accordance with aspects of the present invention.

In accordance with aspects of the invention, the analyzer module 250 of the mediator server 225 of FIG. 2 is configured to use the lineage metadata 260 to optimize data communication for a second or later (e.g., subsequent) data transfer request for a same dataset that was previously transferred from a source cloud to a destination cloud in a first (e.g., earlier) data transfer request. A dataset (e.g., dataset D1) may have been previously transferred multiple times between the first cloud 215 and the second cloud 220. This dataset may have been the subject of different requests for different roles of user, and hence there may be plural transformed copies of the dataset on the second cloud 220 in different views. For example, different policies from the policy data 225 may apply to different ones of the data transfer requests for this dataset (e.g., due to different roles of different users making the data transfer requests), and different transformations may have been performed on the dataset as a result of the different policies. In embodiments, the mediator server 225 is configured to leverage one or more copies of the transformed dataset stored on the second cloud 220 to serve a current data transfer request for the same dataset from the first cloud 215 to the second cloud 220. In embodiments, the mediator module 245 determines the target view of the current request based on the policy data 255 (e.g., at step 305 of FIG. 3). In embodiments, based on this determined target view, the analyzer module 250 uses the lineage metadata 260 to identify a first subset of columns of the target view that are already on or can be constructed from data on the second cloud 220 (e.g., step 310), and identifies a second subset of columns of the target view that are not on the second cloud 220 (e.g., step 315). In embodiments, the mediator module 245 extracts the first subset of columns from one or more copies of the dataset on the second cloud 220 and applies transformations to one or more of these columns based on the policy data 255 (e.g., step 320). In embodiments, the mediator module 245 extracts the second subset of columns from the dataset on the first cloud 215 applies transformations to one or more of these columns based on the policy data 255 (e.g., step 325). In embodiments, the mediator module 245 creates the target view by collating the first subset and the second subset after, any such transformations, and serves the target view to the requestor (e.g., at step 330).

In a first exemplary use case, a current request for dataset D1 is made to transfer from the first cloud 215 to the second cloud 220 at time t2. In this example, the analyser module 250 uses the lineage metadata 260 to determine if dataset D1 has already been transferred sometime in the past (e.g., at time t1) to the second cloud 220 for the same role. If yes, then a copy of the dataset D1 on the second cloud 220 is in the same required target view as the current request. This is because the same policies from the policy data 255 would apply to the previous request at time t1 and the current request at time t2 since both requests are for the same dataset (D1) to the same destination cloud (second cloud 220) and for the same user role. In this example, the mediator module 245 makes the stored copy of the dataset D1 available to the requestor for the current request (if there are no updates on dataset D1 on the first cloud 215 between time t1 and time t2).

A second exemplary use case is the same as the first except that one or more updates are made to the dataset D1 on the first cloud 215 between time t1 and time t2. In embodiments, the CDC information 240 contains information that defines what updates were made to the dataset D1 so that new or updates rows can be handled separately. For example, the CDC information 240 indicates which rows of the dataset D1 are new or updated between time t1 and time t2. In this example, these updated rows do not exist in the copy of the dataset on the second cloud 220 since the updates happened after time t1 when the dataset D1 was transferred to the second cloud 220. As such, these updated rows are transferred to the second cloud 220, after applying suitable transformations on relevant columns. These rows which are in the desired target view now, are then collated with data retrieved from the copy on the second cloud 220 (pertaining to time t1). In embodiments, the CDC information 240 also indicates which rows have been deleted on the first cloud 215. Identifiers (IDs) of such row are sent to the second cloud 220 and these rows are dropped while retrieving data from the copy on the second cloud 220 (pertaining to time t1). In embodiments, once the mediator server 225 has created the final view on the second cloud 220 at time t2, the copy from time t1 can be dropped (e.g., deleted from the second cloud 220) since a more recent copy of the data now exists in the same view.

In a third exemplary use case, two different data transfer requests for the same dataset D1 at time t1 and t2 are from two different roles. This implies that a different target view of data is presented, and different transformations are applied. From the lineage metadata 260, the analyzer module 250 determines the transformations applied during data transfer at time t1. From this, the analyzer module 250 determines which columns in the target view can be constructed from the copy associated with time t1, either as-is or by applying a suitable transformation. In this example, the remaining columns in the target view are constructed by transferring data in relevant columns from the first cloud 215. This example works correctly when there are no updates on the dataset D1 between time t1 and time t2.

A fourth exemplary use case is the same as the third except that one or more updates are made to the dataset D1 on the first cloud 215 between time t1 and time t2. In this example, the analyzer module 250 takes a similar approach to the updated data as described above in the second exemplary use case. For example, new or updated rows of the dataset D1 are transferred from the first cloud 215 to the second cloud 220 and suitable transformations are applied on the relevant columns of these rows based on the policy data 255. For rows that have been deleted from the dataset D1 on the first cloud 215 between time t1 and time t2, the row IDs of these rows are transferred to the second cloud so that these rows can be dropped (e.g., deleted) while retrieving/constructing the data from the copy corresponding to the time t1. The processing then continues as described in the thirds use case.

In a fifth exemplary use case, there are multiple copies of the transformed dataset D1 on the second cloud 220 as a result of multiple data transfer requests for the dataset D1. Each copy may have a different view due to different transformations being applied based on different policies. In this example, the analyzer module 250 uses the respective lineage metadata of each respective previous request to identify columns in the multiple copies on the second cloud 220 that can be used to create some or all of the target view of a current request for the same dataset D1. In embodiment, the analyzer module 250 may be programmed with cost optimization logic to select a best (e.g., lowest cost) option when multiple columns are available from the multiple copies on the second cloud 220.

As described herein, transformations may include but are not limited to: redact, obfuscate, substitute, scramble, shuffle, and nullify. In accordance with aspects of the invention, the analyzer module 250 determines transformation relationships to identify which transformations can be derived from which other transformations. A first example of a transformation relationship is that redacted data can be constructed from obfuscated data. For example, a redacted view can be constructed from an obfuscated string by replacing each character in the strung with the letter X. In this manner, a redacted view can be obtained from either the original column or an obfuscated view of the column. A second example of a transformation relationship is that substituted data can be constructed from obfuscated data. These are just two examples and other transformation relationships may be determined for other pairs of transformations. In embodiments, the analyzer module 250 uses the transformation relationships to optimize the data communication when serving a data transfer request. In one example, the analyzer module 250 determines whether a column in a target view of a current request can be constructed from a column on the destination cloud using one of the transformation relationships. For example, if the copy on the destination cloud contains a column in an obfuscated format, then the analyzer module 250 determines that a redacted or substituted version of the same column can be created from this copy. This eliminates the need to transfer this column from the source cloud to the destination cloud, thus providing cost savings.

Figure 4:
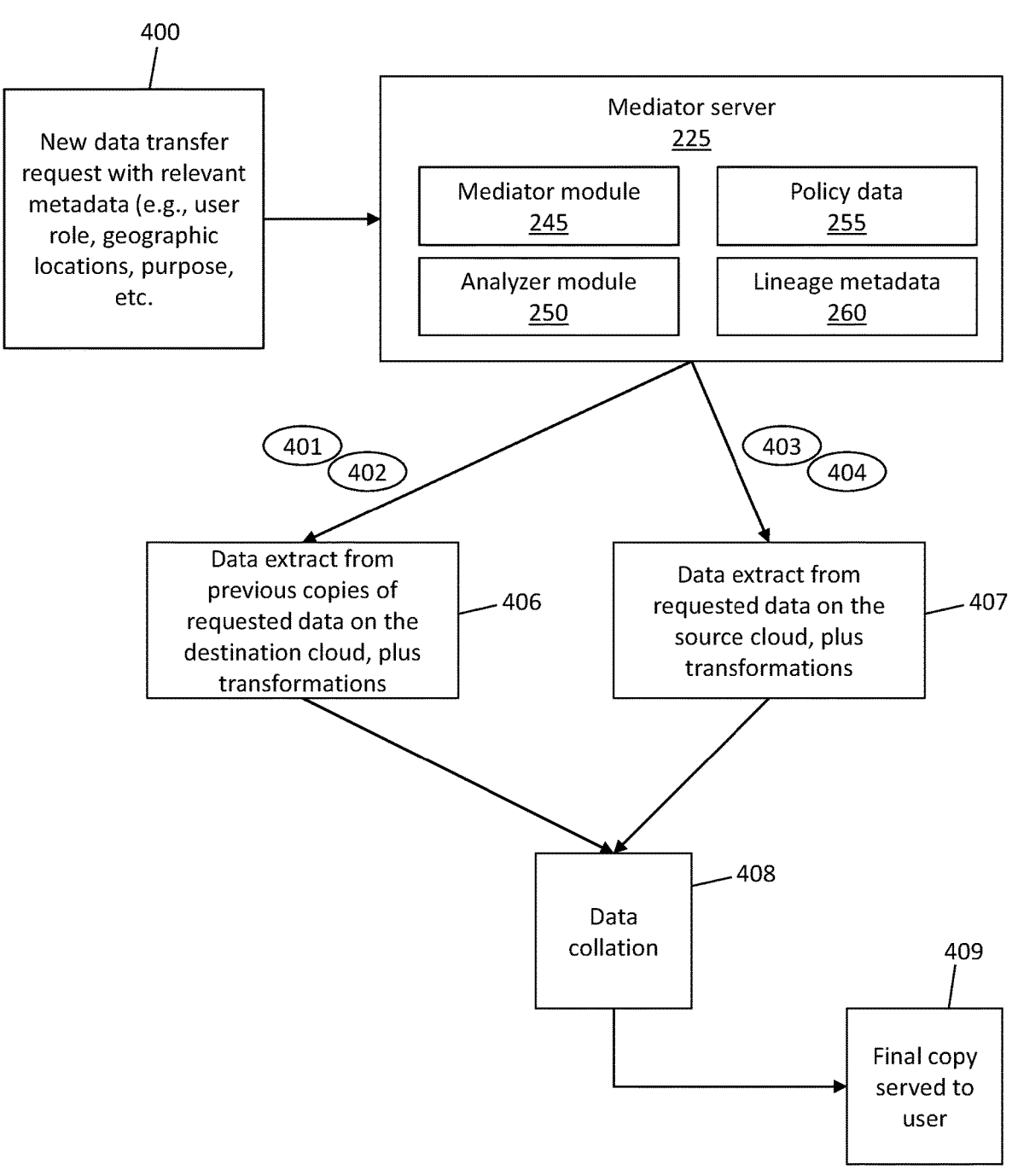
FIG. 4 shows a block diagram in accordance with aspects of the present invention.

FIG. 4 shows a block diagram of a method in accordance with aspects of the invention. In FIG. 4, a new data transfer request is received at step 400, e.g., from the user device 230 of FIG. 2. At step 401, the mediator server 225 identifies columns to be extracted from one or more copies of the dataset on the destination cloud and any transformations to be applied on these columns. At step 402, the mediator server 225 transfers IDs of rows to be dropped from the copies of the dataset on the destination cloud due to changes applied to the dataset on the source cloud between time t1 and t2. At step 403, the mediator server 225 identifies columns from the dataset on the source cloud and any transformations to be applied to these columns. At step 404, the mediator server 225 transfers new or updated rows to the copies on the destination cloud and identifies any relevant transformations for these rows to get the data in the target view. For situations where the datasets on the source cloud are static (e.g., unchanged), then steps 402 and 404 are null. Step 406 represents extracting the first subset of data from one or more copies on the destination cloud and applying the transformations determined at step 401. Step 407 represents extracting the second subset of data from the dataset on the source cloud and applying the transformations determined at step 403. Step 408 represents collating the data from steps 406 and 407. Step 409 represents serving the final copy to the user.

Figure 5:
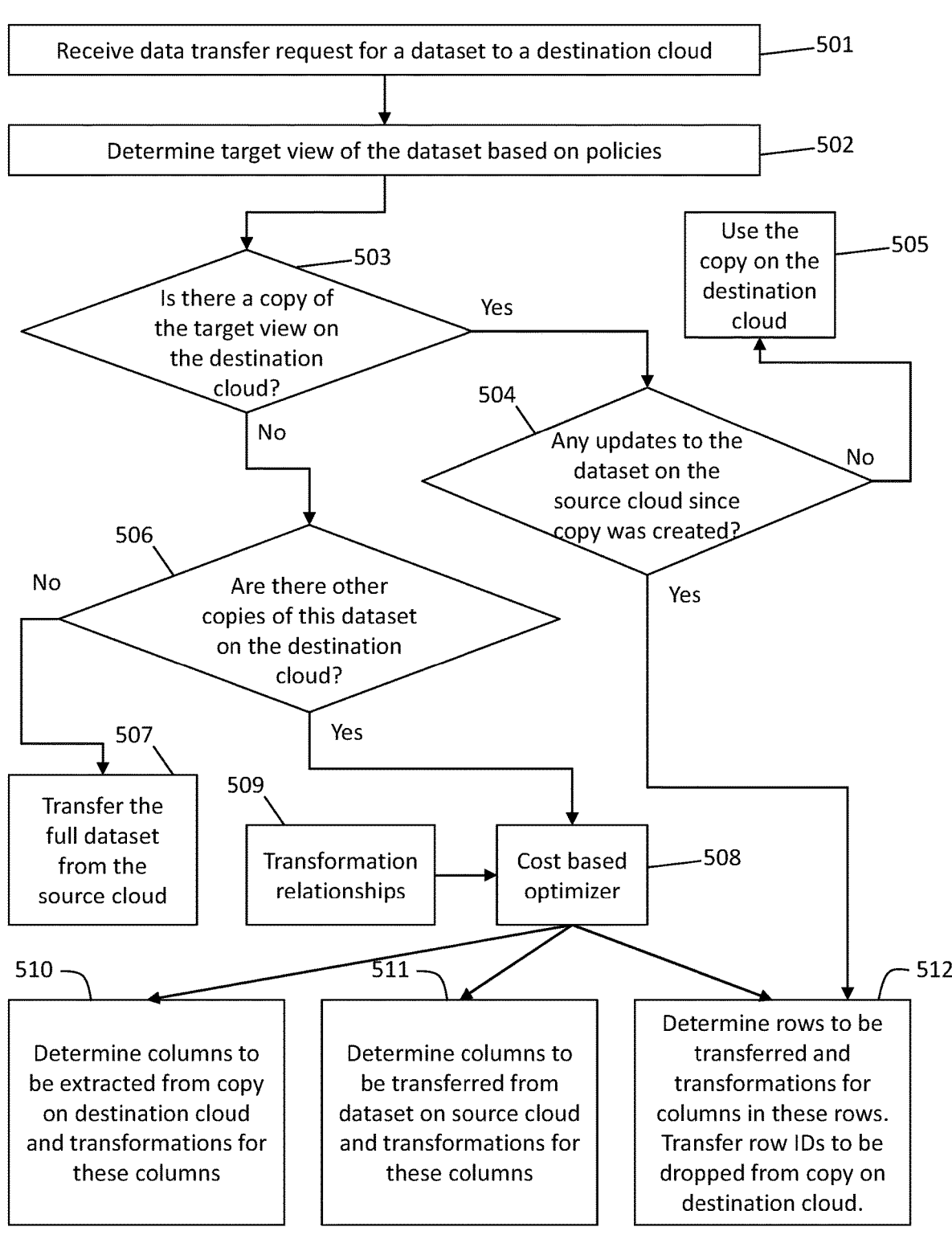
FIG. 5 shows a flowchart of an exemplary method in accordance with aspects of the present invention.

FIG. 5 shows a flowchart of a method of the mediator server 225 in accordance with aspects of the invention. Steps of the method may be carried out in the environment of FIG. 2 and are described with reference to elements depicted in FIG. 2.

At step 501, the mediator server 225 receives a data transfer request for a dataset to a destination cloud. At step 502, the mediator server 225 determines a target view of the request from step 501 based on metadata included in the request and policies on the policy data 255. At step 503, the server 225 determines whether there is a copy of this target view already on the destination cloud, e.g., from a previous request that produced the same target view for this dataset. If yes at step 503, then at step 504 the server 225 determines whether any changes occurred to the dataset on the source cloud after the time the copy of the target view from step 503 was created. If no at step 504, then at step 505 the server 225 serves the copy of the target view to the user who made the request at step 501. In this situation, no data of the dataset is transferred from the source cloud to the destination cloud in serving the request. If yes at step 504, then the process proceeds to step 512.

If no at step 503, then at step 506 the server 225 determines whether there are any other copies of this dataset on the destination cloud. If no at step 506, then at step 507 the server 225 transfers the full dataset from the source cloud and makes transformations according to policies to create the target view. If yes at step 506, then at step 508 the server 225 utilizes the cost-based optimizer to determine which columns to use from the multiple copies of the dataset on the destination cloud. In embodiments, the server 225 uses transformation relationships indicated at step 509 in making this determination.

At step 510, the server 225 determines columns to be extracted from copy on destination cloud and transformations for these columns. At step 511, the server 225 determines columns to be transferred from dataset on source cloud and transformations for these columns. At step 512, the server 225 determine updated or changed rows to be transferred from the dataset on the source cloud to the copies on the destination cloud and transformations for columns in these rows. Step 512 may also include determining row IDs to be dropped from copies on the destination cloud.

Figure 6:
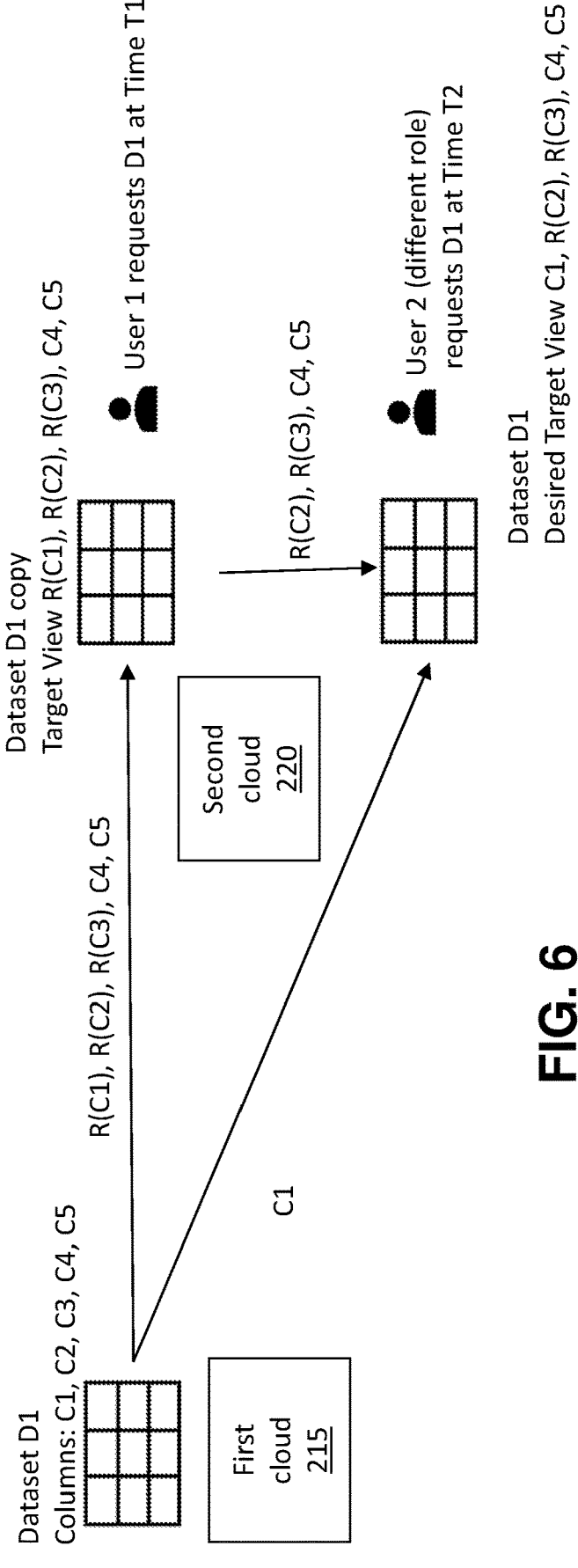
FIG. 6 shows an exemplary operation in accordance with aspects of the present invention.

FIG. 6 shows an exemplary operation in accordance with aspects of the invention. Steps of the operation may be carried out in the environment of FIG. 2 and are described with reference to elements depicted in FIG. 2. In FIG. 6, dataset D1 at the source cloud (e.g., first cloud 215) includes columns C1, C2, C3, C4, C5. At time T1, user 1 requests dataset D1 in a first request. Based on the request from user 1 and the policy data 255, the server 225 determines that the target view includes R(C1), R(C2), R(C3), C4, C5, where R indicates the data in the column is redacted. In this example, the server 225 applies the transformations and serves the dataset D1 copy to user 1 and stores the copy on the destination cloud (e.g., second cloud 220). In this example, at time T2 after time T1, user 2 requests dataset D1 in a second request. Based on the request from user 2 and the policy data 255, the server 225 determines that the target view includes C1, R(C2), R(C3), C4, C5, where R indicates the data in the column is redacted. In this example, the server 225 uses the lineage metadata 260 associated with the request from time T1 to determine that a copy of dataset D1 exists on the second cloud 220 and this copy includes R(C1), R(C2), R(C3), C4, C5. The server 225 determines a first subset including R(C2), R(C3), C4, C5 that can be obtained from the copy on the second cloud 220. The server 225 determines a second subset including C1 that cannot be obtained from the copy on the second cloud 220 and therefore is obtained from dataset D1 on the first cloud 215. The server 225 creates the target view for the second request by collating the first subset from the destination cloud and the second subset from the source cloud. From this example, it is seen that only one column of data is transferred from the source cloud to the destination cloud for the second request, resulting in significant savings in communication cost. Further, the system also saved processing cost in redacting columns C2 and C3.

Figure 7:
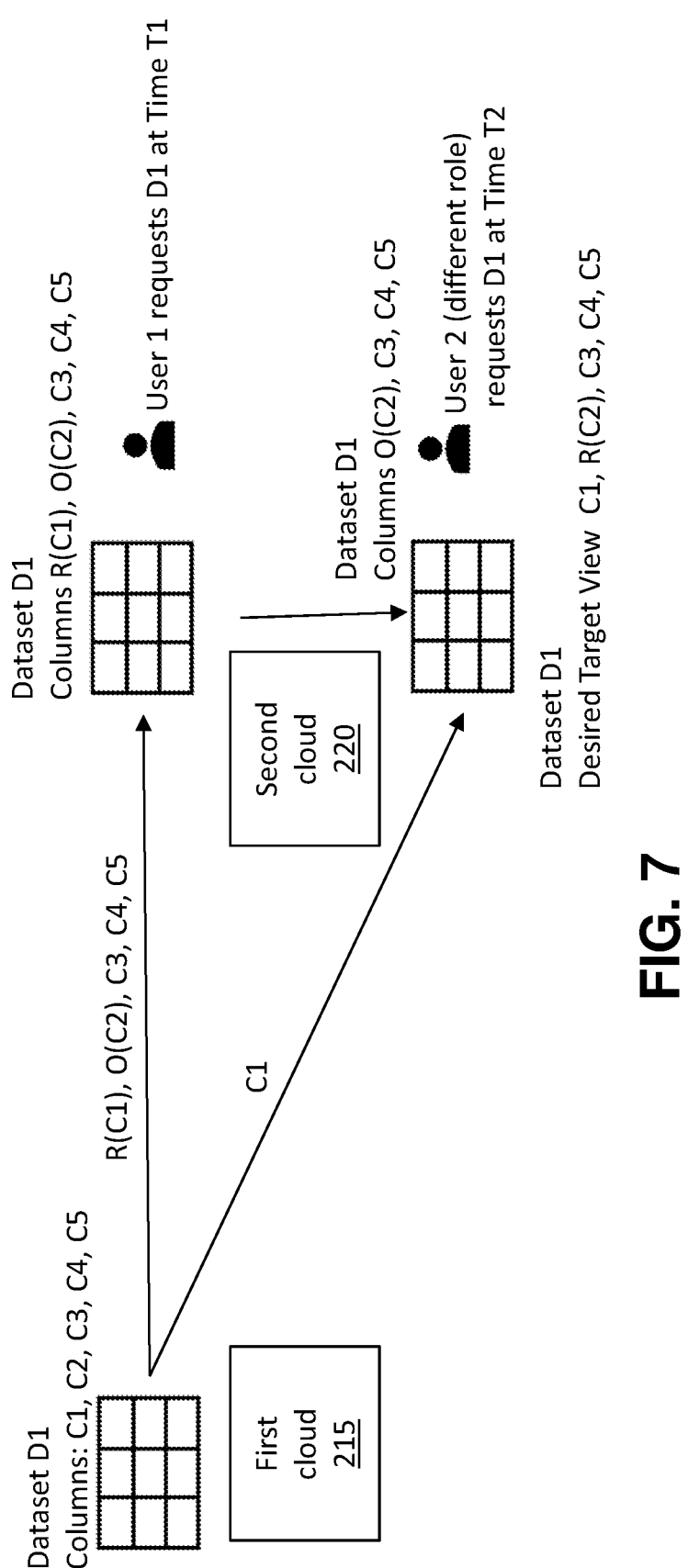
FIG. 7 shows an exemplary operation in accordance with aspects of the present invention.

FIG. 7 shows an exemplary operation in accordance with aspects of the invention. Steps of the operation may be carried out in the environment of FIG. 2 and are described with reference to elements depicted in FIG. 2. In FIG. 7, dataset D1 at the source cloud (e.g., first cloud 215) includes columns C1, C2, C3, C4, C5. At time T1, user 1 requests dataset D1 in a first request. Based on the request from user 1 and the policy data 255, the server 225 determines that the target view includes R(C1), O(C2), C3, C4, C5, where R indicates the data in the column is redacted and O indicates the data in a column is obfuscated. In this example, the server 225 applies the transformations and serves the dataset D1 copy to user 1 and stores the copy on the destination cloud (e.g., second cloud 220). In this example, at time T2 after time T1, user 2 requests dataset D1 in a second request. Based on the request from user 2 and the policy data 255, the server 225 determines that the target view includes C1, R(C2), C3, C4, C5, where R indicates the data in the column is redacted. In this example, the server 225 uses the lineage metadata 260 associated with the request from time T1 to determine that a copy of dataset D1 exists on the second cloud 220 and this copy includes R(C1), O(C2), C3, C4, C5. The server 225 determines that C3, C4, C5 can be used from the copy on the destination cloud instead of transferring these columns again from the source cloud for this second request. The server 225 also determines using transformation relationships that R(C2) in the target view of the second request can be constructed from O(C2) in the copy from the first request. The server obtains C1 from the source cloud and collates this C1 with the constructed R(C2) and the extracted C3, C4, C5 to create the target view of the second request. In this manner, it is seen that the system reduces the amount of data transferred from the source cloud to the destination cloud when serving the second request, and this reduction in the amount of data transfer corresponds to cost savings.

Figure 8:
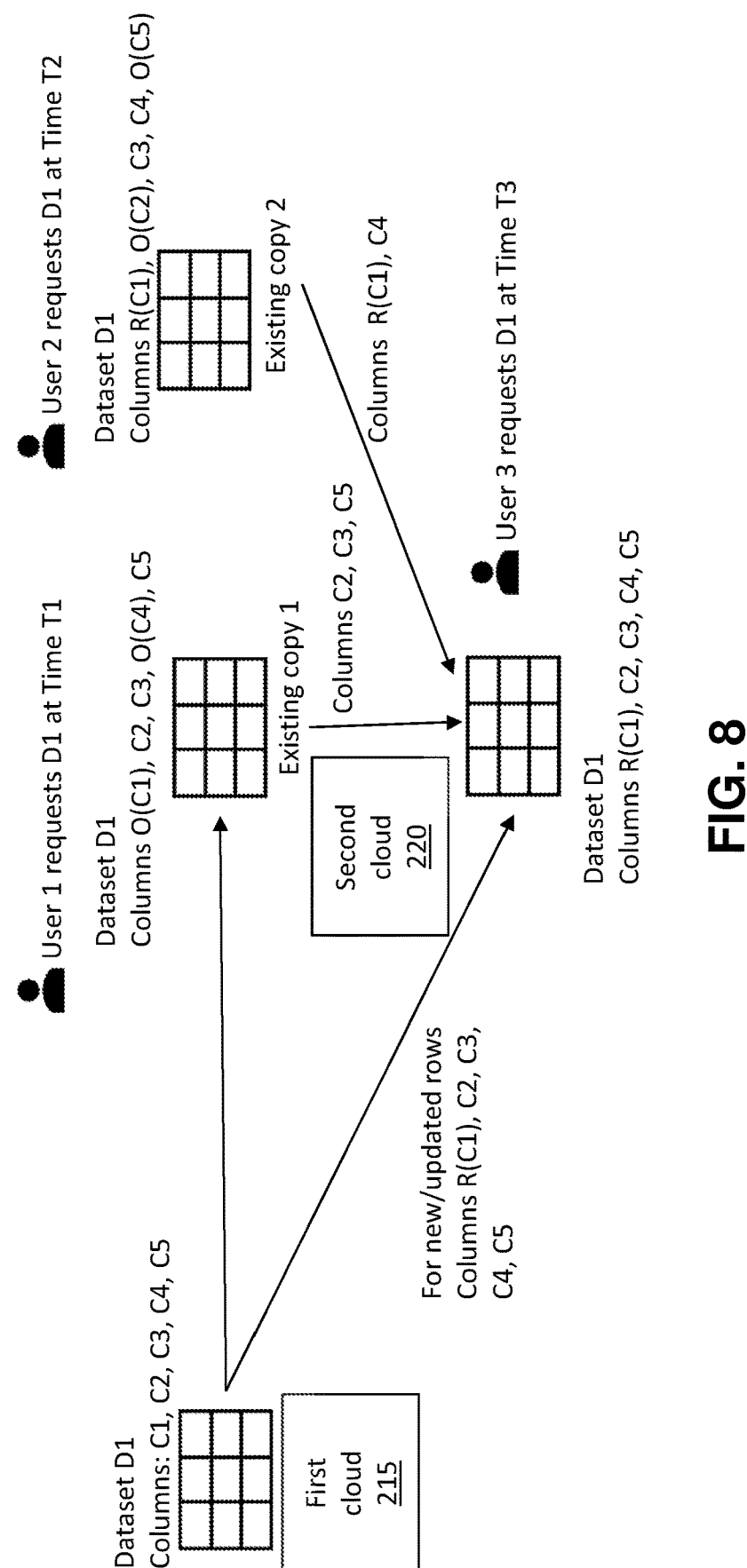
FIG. 8 shows an exemplary operation in accordance with aspects of the present invention.

FIG. 8 shows an exemplary operation in accordance with aspects of the invention. Steps of the operation may be carried out in the environment of FIG. 2 and are described with reference to elements depicted in FIG. 2. In FIG. 8, dataset D1 at the source cloud (e.g., first cloud 215) includes columns C1, C2, C3, C4, C5. At time T1, user 1 requests dataset D1 in a first request. Based on the request from user 1 and the policy data 255, the server 225 determines that the target view includes O(C1), C2, C3, O(C4), C5, where O indicates the data in a column is obfuscated. In this example, the server 225 applies the transformations and serves the dataset D1 copy to user 1 and stores the copy on the destination cloud (e.g., second cloud 220). In this example, at time T2 after time T1, user 2 requests dataset D1 in a second request. Based on the request from user 2 and the policy data 255, the server 225 determines that the target view includes R(C1), O(C2), C3, C4, O(C5), where R indicates the data in the column is redacted and O indicates the data in a column is obfuscated. In this example, the server 225 applies the transformations and serves the dataset D1 copy to user 2 and stores the copy on the destination cloud (e.g., second cloud 220). In this example, at time T3 after time T2, user 3 requests dataset D1 in a third request. Based on the request from user 3 and the policy data 255, the server 225 determines that the target view includes R(C1), C2, C3, C4, C5, where R indicates the data in the column is redacted. In this example, the server 225 uses the lineage metadata 260 associated with the first request from time T1 to determine that a first copy of dataset D1 exists on the second cloud 220 and this first copy includes O(C1), C2, C3, O(C4), C5. The server 225 also uses the lineage metadata 260 associated with the second request from time T2 to determine that a second copy of dataset D1 exists on the second cloud 220 and this second copy includes R(C1), O(C2), C3, C4, O(C5). The server 225 determines that it can create the target view for the third request using C2, C3, C5 from the first copy on the destination cloud and using R(C1), C4 from the copy on the destination cloud without transferring any data of dataset D1 from the source cloud to the destination cloud when serving the third request.

With continued reference to FIG. 8, in this example the dataset D1 on the source cloud is undergoing updates. In this example, the CDC information 240 indicates that 100 rows were added to the dataset D1 between time T1 and time T2 (row-IDs R1-R100) and another 100 rows (row-IDs R101-R200) were added to the dataset D1 between time T2 and time T3. In this example, the server 225 transfers these 200 rows to the with appropriate transformations applied on some columns (e.g., redact on C1 in this example). The server 225 then collates the three parts of data to serve User 3 request. In embodiments, the data collation process of the server 225 recognizes that row-IDs R1-R100 are present in the copy at T2 and these 100 rows from the copy at T2 can be ignored.

Figure 9:
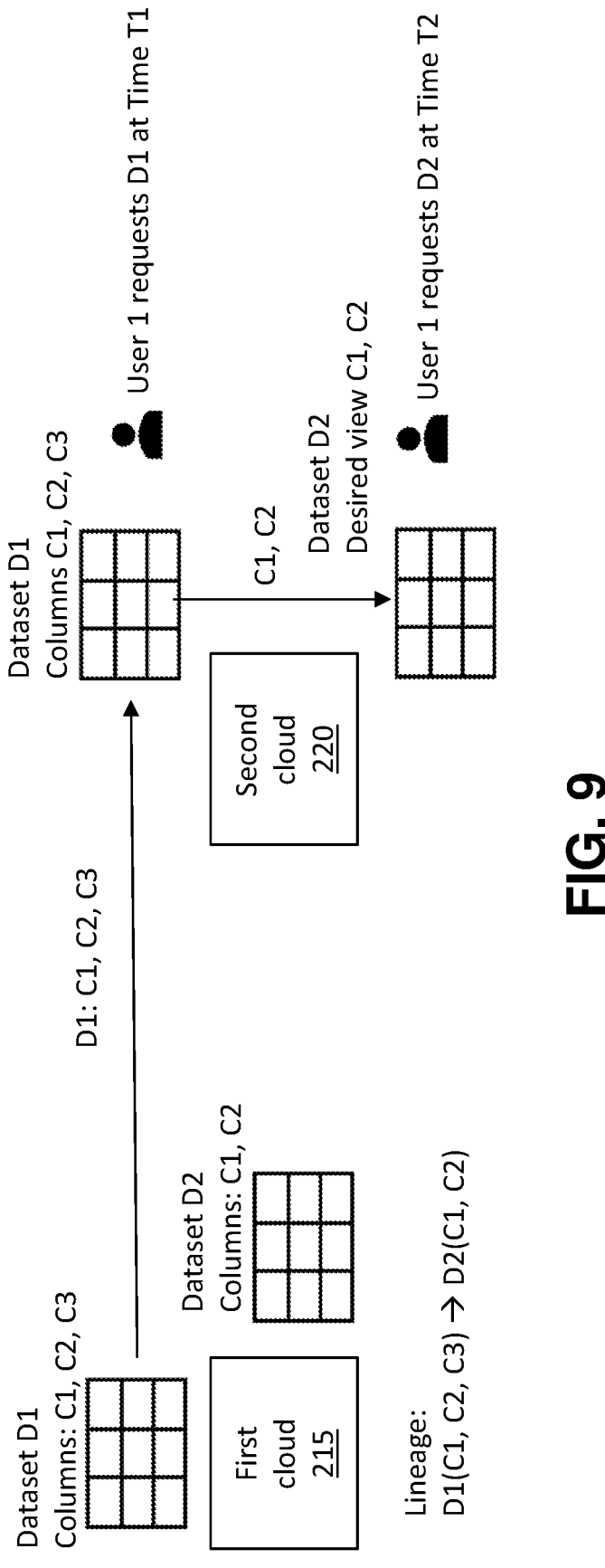
FIG. 9 shows an exemplary operation in accordance with aspects of the present invention.

FIG. 9 shows an exemplary operation in accordance with aspects of the invention. Steps of the operation may be carried out in the environment of FIG. 2 and are described with reference to elements depicted in FIG. 2. FIG. 9 shows an example in which the server 225 uses the data lineage information 235 to further optimize data transfer. In the example of FIG. 9, at the first cloud 215 dataset D1 has three columns C1, C2, C3 and dataset D2 is derived from dataset D1 by dropping column C3. Dataset D2 hence has two columns C1 and C2. The relationship between dataset D1 and dataset D2 is stored in the data lineage information 235 of the first cloud 215.

In the example of FIG. 9, at time T1, user 1 requests dataset D1 in a first request. Based on the request from user 1 and the policy data 255, the server 225 determines that the target view includes C1, C2, C3. In this example, the server 225 serves the dataset D1 copy to user 1 and stores the copy on the destination cloud (e.g., second cloud 220). In this example, at time T2 after time T1, user 2 requests dataset D2 in a second request. Based on the request from user 2 and the policy data 255, the server 225 determines that the target view includes C1, C2.

In this example, the server 225 uses the data lineage information 235 to determine that C1, C2 of dataset D2 are the same as C1, C2 of dataset D1. In this example, the server 225 also uses the lineage metadata 260 associated with the request from time T1 to determine that a copy of dataset D1 exists on the second cloud 220 and this copy includes C1, C2, C3. The server 225 determines that C1, C2 from the copy of dataset D1 on the destination cloud can be used to create the desired view of C1, C2 of dataset D2 for the second request. In this example, the server 225 serves the second request for the dataset D2 using the copy of the dataset D1 on the second cloud 220, rather than transferring the dataset D2 from the first cloud 215 to the second cloud 220. In this manner, it is seen that the system reduces the amount of data transferred from the source cloud to the destination cloud when serving the second request, and this reduction in the amount of data transfer corresponds to cost savings.

Figure 10:
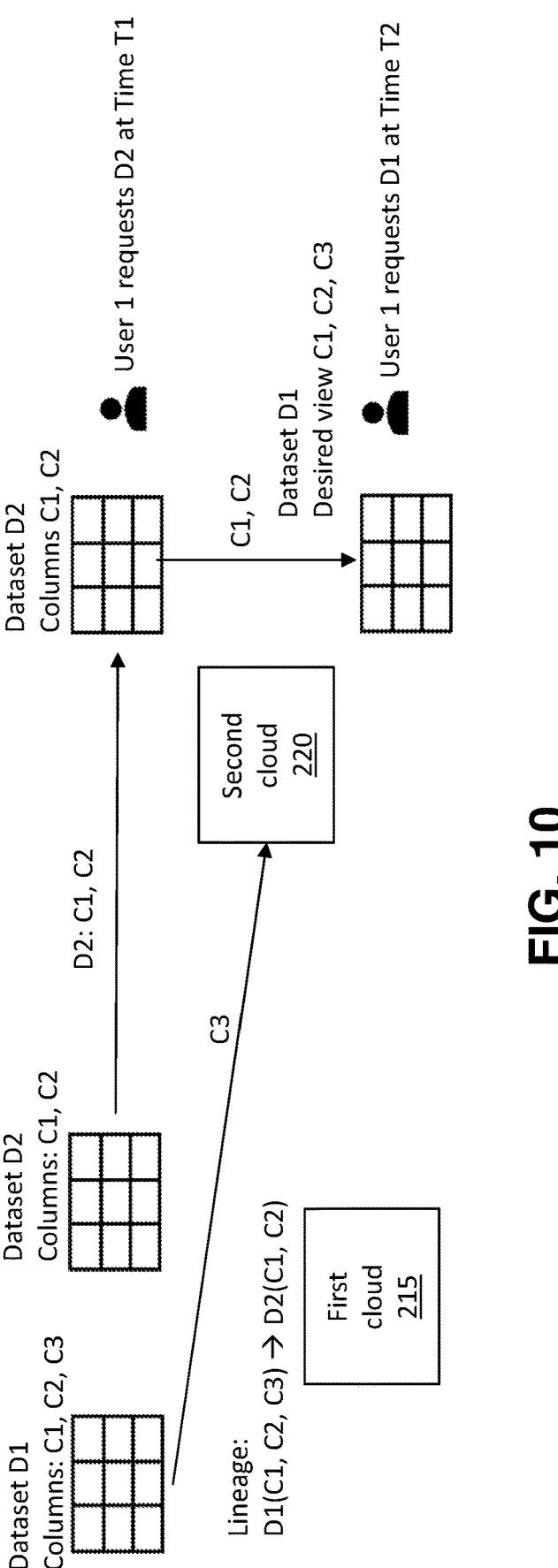
FIG. 10 shows an exemplary operation in accordance with aspects of the present invention.

FIG. 10 shows an exemplary operation in accordance with aspects of the invention. Steps of the operation may be carried out in the environment of FIG. 2 and are described with reference to elements depicted in FIG. 2. FIG. 10 shows an example in which the server 225 uses the data lineage information 235 to further optimize data transfer. In the example of FIG. 10, at the first cloud 215 dataset D1 has three columns C1, C2, C3 and dataset D2 is derived from dataset D1 by dropping column C3. Dataset D2 hence has two columns C1 and C2. The relationship between dataset D1 and dataset D2 is stored in the data lineage information 235 of the first cloud 215.

In the example of FIG. 10, dataset D2 including C1, C2 is transferred from the first cloud 215 to the second cloud 220 based on a request from user 1 for dataset D2 at time T1. In the example of FIG. 10, at time T2, user 1 requests dataset D1 in a second request. Based on this request and the policy data 255, the server 225 determines that the target view includes C1, C2, C3. In this example, the server 225 uses the data lineage information 235 to determine that C1, C2 of dataset D2 are the same as C1, C2 of dataset D1. In this example, the server 225 also uses the lineage metadata 260 associated with the request from time T1 to determine that a copy of dataset D2 exists on the second cloud 220 and this copy includes C1, C2. The server 225 determines that C1, C2 from the copy of dataset D2 on the destination cloud can be used to create part of the desired view of C1, C2, C3 of dataset D1 for the second request. The server 225 determines that C1 is to be obtained from the source cloud. The server 225 creates the desired view C1, C2, C3 for the second request using C1, C2 from the copy of dataset D2 on the destination cloud and using C3 from the source cloud.

Figure 11:
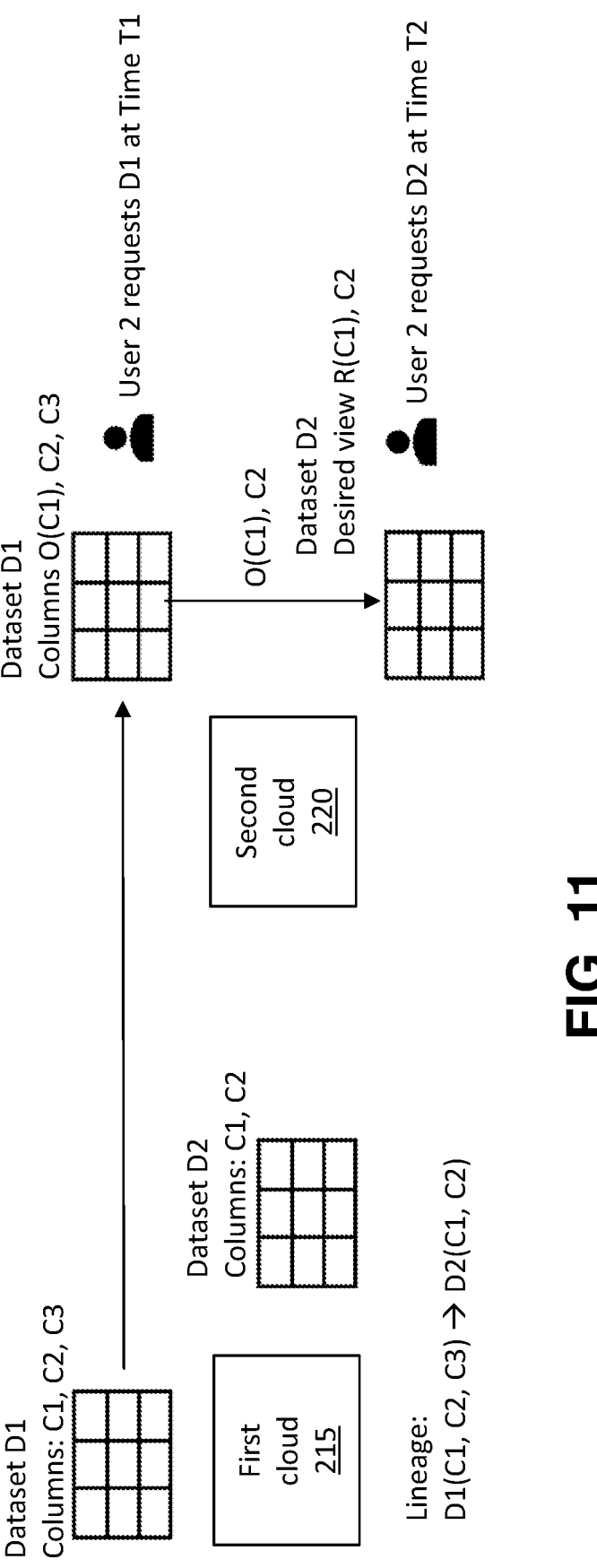
FIG. 11 shows an exemplary operation in accordance with aspects of the present invention.

FIG. 11 shows an exemplary operation in accordance with aspects of the invention. Steps of the operation may be carried out in the environment of FIG. 2 and are described with reference to elements depicted in FIG. 2. FIG. 11 shows an example in which the server 225 uses the data lineage information 235 to further optimize data transfer. In the example of FIG. 11, at the first cloud 215 dataset D1 has three columns C1, C2, C3 and dataset D2 is derived from dataset D1 by dropping column C3. Dataset D2 hence has two columns C1 and C2. The relationship between dataset D1 and dataset D2 is stored in the data lineage information 235 of the first cloud 215.

In the example of FIG. 11, a first request for dataset D1 at time T1 results in a target view O(C1), C2, C3 being served to the user and saved on the second cloud 220. In the example of FIG. 11, a second request for dataset D2 at time T2 results in a target view of R(C1), C2. In this example, the server 225 uses the data lineage information 235 to determine that C1, C2 of dataset D2 are the same as C1, C2 of dataset D1. In this example, the server 225 also uses the lineage metadata 260 associated with the request from time T1 to determine that a copy of dataset D1 exists on the second cloud 220 and this copy includes O(C1), C2, C3. In this example, the server 225 also uses the transformation relationship to determine that O(C1) can be constructed from R(C1). The server 225 thus creates the desired view R(C1), C2 for the second request using data stored at the second cloud 220 and without transferring dataset D2 from the first cloud 215 to the second cloud 220 when serving the second request. This saves data communication costs by not transferring the dataset D2 from the first cloud 215 to the second cloud 220 when serving the second request.

FIG. 12 shows a flowchart of an exemplary method in accordance with aspects of the present invention. Steps of the method may be carried out in the environment of FIG. 2 and are described with reference to elements depicted in FIG. 2.

At step 1205, the system receives a data transfer request to transfer a dataset stored on a source cloud to a destination cloud. In embodiments, the server 225 receives a request from the user device 230 to transfer a dataset (e.g., D1) from the first cloud 215 (i.e., the source cloud) to the second cloud 220 (i.e., the destination cloud).

At step 1210, the system determines a target view of the data transfer request based on one or more policies. In embodiments, the server 225 determines the target view for the request using metadata associated with the request (e.g., role of the user, geographic location of the user, geographic location of the source cloud, geographic location of the destination cloud, purpose for which the data is being requested) and one or more policies defined in policy data 255. The one or more policies may define one or more transformations to apply to the data to create the target view.

At step 1215, the system determines, using lineage metadata, a first portion of the target view exists in one or more copies of a dataset stored on the destination cloud. In embodiments, the server 225 uses the lineage metadata 260 of previous requests to determine that one or more columns of the target view are included in one or more copies of datasets stored on the destination cloud.

At step 1220, the system extracts data corresponding to the first portion from the one or more copies of the dataset stored on the destination cloud. In embodiments, the server 225 copies that data of one or more columns from the one or more copies of datasets stored on the destination cloud.

At step 1225, the system creates the target view using the extracted data. In embodiments, the server 225 uses the data obtained from the one or more copies of datasets stored on the destination cloud (from step 1220) to at least partially create the target view for the request from step 1205. By using data from the destination cloud to create at least some of the target view, the method reduces the amount of data communication from the source cloud to the destination cloud. At step 1230, the system serves the data transfer request using the created target view.

In embodiments of the method, the one or more copies of the dataset stored on the destination cloud result from one or more previous data transfer requests for the dataset stored on the source cloud, e.g., requests for the same dataset as depicted at FIGS. 6-8.

In embodiments of the method, the one or more copies of the dataset stored on the destination cloud are a different dataset than the dataset stored on the source cloud, e.g., as depicted at FIGS. 9-11. In embodiments, the method further comprises identifying the one or more copies of the dataset stored on the destination cloud using data lineage information 235 of the source cloud.

In embodiments, the method further comprises: determining, using the lineage metadata, a second portion of the target view does not exist in the one or more copies of a dataset stored on the destination cloud; transferring data corresponding to the second portion from the dataset stored on the source cloud; and creating the target view using the extracted data and the transferred data, e.g., as depicted at FIGS. 6 and 7.

In embodiments of the method, the extracting the data comprises constructing a column in the target view using a transformation relationship, e.g., as depicted at FIG. 7.

In embodiments, the method further comprises adding rows to or deleting rows from the created target view based on the changes being made to the dataset stored on the source cloud, e.g., as depicted at FIG. 8.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a processor set of a mediator server, a data transfer request to transfer a dataset stored on a source cloud to a destination cloud, wherein the mediator server is a part of a cloud-based, infrastructure-level platform configured for orchestrating secure data governance across companies and other platforms;
   determining, by the processor set, a target view of the data transfer request based on one or more policies;
   determining, by the processor set, using lineage metadata created by the mediator server for one or more previous data transfer requests for the dataset stored on the source cloud, a first portion of the target view exists in one or more copies of a dataset stored on the destination cloud;
   determining, using the lineage metadata, a second portion of the target view does not exist in the one or more copies of the dataset stored on the destination cloud;
   extracting, by the processor set, data corresponding to the first portion from the one or more copies of the dataset stored on the destination cloud;
   transferring data corresponding to the second portion from the dataset stored on the source cloud;
   creating, by the processor set, the target view using the extracted data and the transferred data; and
   serving, by the processor set, the data transfer request using the created target view.

2. The computer-implemented method of claim 1, wherein the one or more copies of the dataset stored on the destination cloud are a result of one or more previous data transfer requests for the dataset stored on the source cloud.

3. The computer-implemented method of claim 1, wherein the one or more copies of the dataset stored on the destination cloud are a different dataset than the dataset stored on the source cloud.

4. The computer-implemented method of claim 3, further comprising identifying the one or more copies of the dataset stored on the destination cloud using data lineage information of the source cloud.

5. The computer-implemented method of claim 1, wherein the extracting the data comprises constructing a column in the target view using a transformation relationship.

6. The computer-implemented method of claim 1, further comprising adding rows to or deleting rows from the created target view based on changes being made to the dataset stored on the source cloud.

7. A computer program product comprising one or more computer readable storage media having program instructions collectively stored on the one or more computer readable storage media, the program instructions executable to:

receive, by a processor set of a mediator server, a data transfer request to transfer a dataset stored on a source cloud to a destination cloud;

determine a target view of the data transfer request based on one or more policies;

determine, by the processor set, using lineage metadata created by the mediator server, for one or more previous data transfer requests for the dataset stored on the source cloud, that at least a first portion of the target view is constructible from data residing on the destination cloud as a result of the one or more previous data transfer requests;

determine, using the lineage metadata, a second portion of the target view does not exist in one or more copies of a dataset stored on the destination cloud;

transfer data corresponding to the second portion from the dataset stored on the source cloud;

create the target view using the transferred data and the data residing on the destination cloud corresponding to the first portion, thereby reducing an amount of data that is transferred from the source cloud to fulfill the data transfer request; and serve the data transfer request using the created target view.

8. The computer program product of claim 7, wherein the one or more copies of the dataset stored on the destination cloud are the result of one or more previous data transfer requests for the dataset stored on the source cloud.

9. The computer program product of claim 7, wherein the one or more copies of the dataset stored on the destination cloud are a different dataset than the dataset stored on the source cloud.

10. The computer program product of claim 9, wherein the program instructions are executable to identify the one or more copies of the dataset stored on the destination cloud using data lineage information of the source cloud, and wherein the data lineage information defines input datasets on the source cloud, output datasets on the source cloud, and transformations used to generate respective ones of the output datasets from respective ones of the input datasets.

11. The computer program product of claim 7, wherein the constructing the first portion of the target view comprises constructing a column in the target view using a transformation relationship.

12. The computer program product of claim 7, wherein the program instructions are executable to add rows to or delete rows from the created target view based on changes being made to the dataset stored on the source cloud.

13. A system comprising:

a processor set, one or more computer readable storage media, and program instructions collectively stored on the one or more computer readable storage media, the program instructions executable to:

receive a data transfer request to transfer a dataset stored on a source cloud to a destination cloud, wherein the dataset stored on the source cloud comprises plural columns of data;

determine a target view of the data transfer request based on one or more policies, wherein the target view comprises one or more of the plural columns;

determine, using lineage metadata, a first portion of the target view exists in one or more copies of a dataset stored on the destination cloud;

determine, using the lineage metadata, a second portion of the target view does not exist in the one or more copies of a dataset stored on the destination cloud;

extract data corresponding to the first portion from the one or more copies of the dataset stored on the destination cloud;

transfer data corresponding to the second portion from the dataset stored on the source cloud;

create the target view using the extracted data and the transferred data; and serve the data transfer request using the created target view.

14. The system of claim 13, wherein the one or more copies of the dataset stored on the destination cloud are a result of one or more previous data transfer requests for the dataset stored on the source cloud.

15. The system of claim 13, wherein the one or more copies of the dataset stored on the destination cloud are a different dataset than the dataset stored on the source cloud, and the program instructions are executable to identify the one or more copies of the dataset stored on the destination cloud using data lineage information of the source cloud.

16. The system of claim 13, wherein the first portion of the target view comprises a first subset of the one or more of the plural columns, and wherein the second portion of the target view comprises a second subset of the one or more of the plural columns.

17. The system of claim 13, wherein the extracting the data comprises constructing a column in the target view using a transformation relationship.

18. The system of claim 13, wherein the program instructions are executable to add rows to or delete rows from the created target view based on changes being made to the dataset stored on the source cloud.

* * * * *